(12) United States Patent
Vesz

(10) Patent No.: US 12,169,140 B1
(45) Date of Patent: Dec. 17, 2024

(54) COMPOSTABLE SCOOP AND METHOD OF MAKING SAME

(71) Applicant: Compostable, LLC, West Palm Beach, FL (US)

(72) Inventor: Peter Vesz, West Palm Beach, FL (US)

(73) Assignee: Compostable, LLC, West Palm Beach, FL (US)

( * ) Notice: Subject to any disclaimer, the term of this patent is extended or adjusted under 35 U.S.C. 154(b) by 0 days.

(21) Appl. No.: 18/606,007

(22) Filed: Mar. 15, 2024

(51) Int. Cl.
| | |
|---|---|
| *G01F 19/00* | (2006.01) |
| *D21J 1/02* | (2006.01) |
| *D21J 1/06* | (2006.01) |
| *D21J 1/16* | (2006.01) |
| *D21J 3/00* | (2006.01) |

(52) U.S. Cl.
CPC ................. *G01F 19/002* (2013.01)

(58) Field of Classification Search
CPC . G01F 19/002; D21J 3/00; D21J 1/006; D21J 1/02; D21J 1/16
USPC ............................................. 30/324
See application file for complete search history.

(56) References Cited

U.S. PATENT DOCUMENTS

| | | | | |
|---|---|---|---|---|
| 1,114,873 | A * | 10/1914 | Farmer .............. | A47G 21/04 30/328 |
| 1,907,737 | A * | 5/1933 | Christie .............. | A47G 21/04 30/328 |
| 5,918,922 | A * | 7/1999 | Lathrop .............. | G01F 19/002 D10/46.2 |
| 9,869,575 | B2 | 1/2018 | Cross | |
| 11,383,894 | B2 | 7/2022 | Frizzell | |
| 11,696,659 | B2 * | 7/2023 | Das .................. | B26B 3/02 30/314 |
| 11,840,369 | B2 | 12/2023 | Berk et al. | |
| 2005/0247129 | A1 | 11/2005 | Carragan | |
| 2010/0314439 | A1 | 12/2010 | Partington et al. | |
| 2010/0326851 | A1 * | 12/2010 | Mangin ............... | G01F 19/002 206/229 |
| 2013/0119093 | A1 * | 5/2013 | Thomson .............. | G01F 19/002 222/561 |
| 2017/0095100 | A1 * | 4/2017 | White ................. | A47G 21/06 |
| 2023/0039678 | A1 | 2/2023 | Fransen et al. | |
| 2023/0042230 | A1 * | 2/2023 | Tovar Nuez .......... | G01F 19/00 |

(Continued)

FOREIGN PATENT DOCUMENTS

| | | | |
|---|---|---|---|
| DE | 202020103231 | U1 | 6/2020 |
| JP | H08176999 | A | 7/1996 |
| JP | H09123300 | A | 5/1997 |

*Primary Examiner* — Ghassem Alie
(74) *Attorney, Agent, or Firm* — Mark Terry

(57) ABSTRACT

A compostable scoop for use with a powder-like substance includes a first form including a cup shaped element configured for scooping a powder-like material, the cup-shaped element coupled to a handle element configured for holding by hand, the handle element having a channel on its top and a ridge on its bottom for structural rigidity, the first form composed of a compostable composition substantially including pulp, a second form congruent with the first form, wherein the second form is shaped and sized to be pressed on top of, and together with, the first form, the second form composed of the compostable composition substantially including pulp, and an adhesive layer deposited between the first form and the second form, wherein the adhesive layer holds the first and second forms securely together.

18 Claims, 4 Drawing Sheets

(56) References Cited

U.S. PATENT DOCUMENTS

| | | | |
|---|---|---|---|
| 2023/0132527 A1* | 5/2023 | Rueda | D21J 1/02 73/426 |
| 2023/0221160 A1 | 7/2023 | Barde et al. | |
| 2023/0226741 A1 | 7/2023 | Khan et al. | |
| 2023/0321878 A1 | 10/2023 | Larsson et al. | |

* cited by examiner

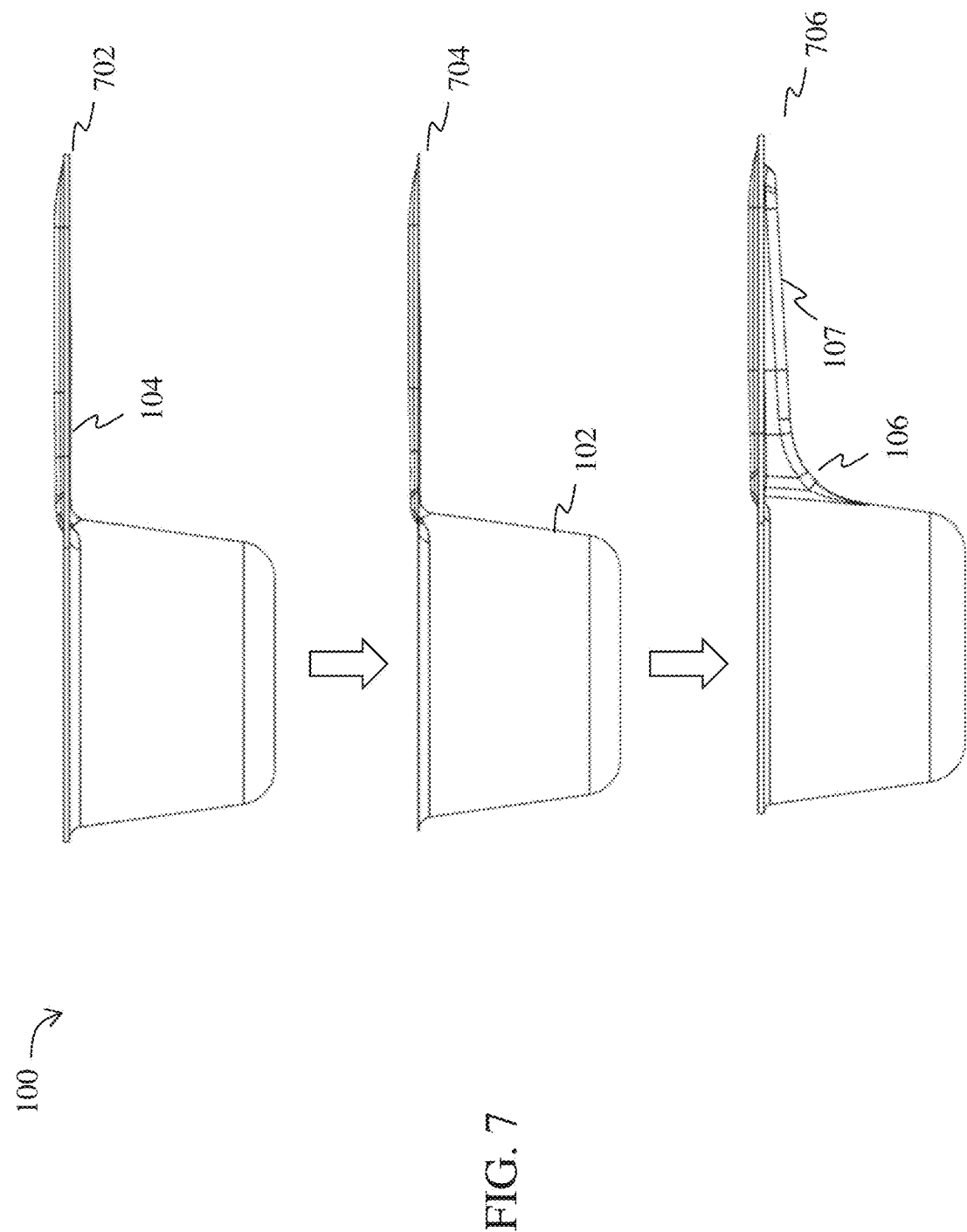

COMPOSTABLE SCOOP AND METHOD OF MAKING SAME

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of scooping tools and, more particularly, to scooping tools for dispensing powder-like materials.

BACKGROUND

Traditional scoops for powder-like materials such as food ingredients, detergents, or agricultural products are typically made of plastic or metal. These materials provide the necessary durability and rigidity but pose significant environmental issues due to their non-biodegradable nature. The disposal of plastic scoops contributes to environmental pollution and the exhaustion of landfill space, while the production and recycling of metal scoops require substantial energy and resources.

There has been a growing trend towards sustainability, leading to the development of biodegradable and compostable products. However, existing compostable products often lack the necessary structural integrity, are not home compostable, or do not provide the required durability for repeated use. Additionally, many biodegradable products are made from materials that still require extensive processing or the use of non-renewable resources. Even when products are made from biodegradable materials, they may not be sourced sustainably, and the production process itself can be resource intensive. There are also concerns regarding the use of synthetic dyes and adhesives in these products, which can impede the composting process and introduce toxins into the environment.

From a consumer perspective, there is a desire for customization and information display on scoops, such as measurement indicators or branding elements. However, incorporating such features into biodegradable scoops without compromising their environmental friendliness has proven difficult. Many current methods of adding such information involve processes or materials that are not environmentally sustainable Therefore, what is needed is an apparatus that improves upon the problems with the prior art, and more particularly for a compostable scoop that aligns with environmental goals without compromising on durability, functionality, and user preferences for customization and information display.

BRIEF SUMMARY

In one embodiment, a compostable scoop for use with a powder-like substance is disclosed. The compostable scoop comprises a first form comprising a cup shaped element configured for scooping a powder-like material, the cup-shaped element coupled to a handle element configured for holding by hand, the handle element having a channel on its top and a ridge on its bottom for structural rigidity, the first form composed of a compostable composition substantially comprising pulp, a second form congruent with the first form, wherein the second form is shaped and sized to be pressed on top of, and together with, the first form, the second form composed of the compostable composition substantially comprising pulp, and an adhesive layer deposited between the first form and the second form, wherein the adhesive layer holds the first and second forms securely together.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

FIG. 7 is a side perspective exploded view of the claimed compostable scoop showing its components, in accordance with one embodiment.

DETAILED DESCRIPTION

Figure 3:
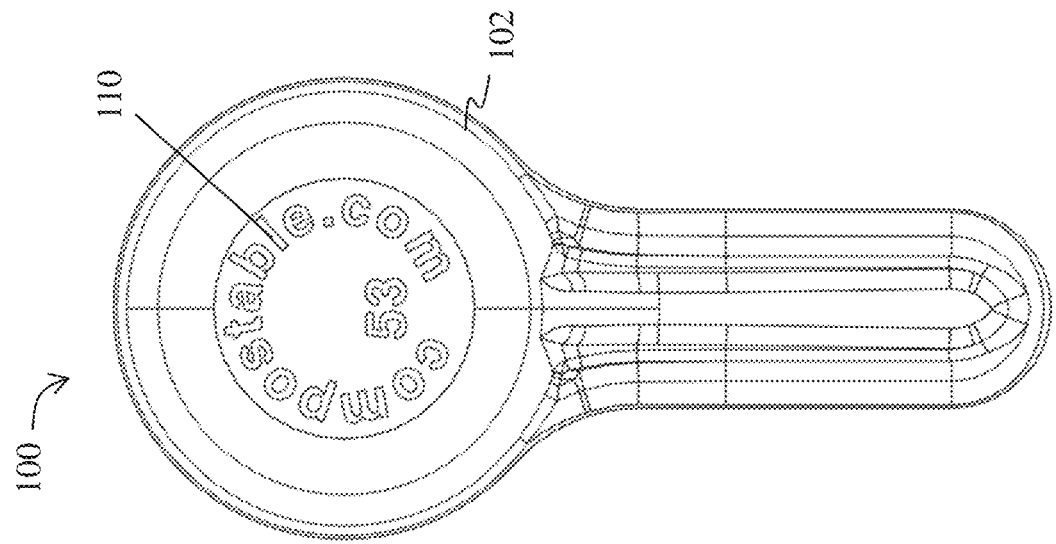
FIG. 3 is a bottom view of the claimed compostable scoop, in accordance with one embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The disclosed embodiments represent a significant advancement over the prior art by addressing the environmental concerns associated with non-biodegradable scoops and the functional limitations of existing biodegradable options. Unlike traditional plastic or metal scoops, the compostable scoop of the disclosed embodiments is made from a sustainable, tree-free pulp material, which ensures that the entire product is biodegradable and compostable, including the adhesive layer, which comprises plant-based ingredients.

A notable improvement is the compostability of the scoop in a home composting environment. This feature is a considerable enhancement over many biodegradable products that require industrial composting facilities. By making the product home compostable, the disclosed embodiments significantly reduces the environmental footprint of the scoop and makes it more accessible and practical for consumers who are increasingly seeking sustainable lifestyle products. The structural design of the compostable scoop also offers improvements in terms of durability and usability. The dual-form design, with a first form and a congruent second form, bonded together with a biodegradable adhesive, provides the necessary rigidity and strength that many single-layer biodegradable scoops lack. This two-form structure ensures that the scoop can withstand the forces of normal use, without the risk of early failure. The handle's design, with a channel on the top and a ridge on the bottom, further enhances the ergonomic experience and structural integrity, respectively.

Furthermore, the physical properties of the scoop, such as its surface roughness, resistance to puncture, tear, and crushing, ensures that the scoop does not only match but potentially exceeds the performance of current non-compostable scoops. The disclosed embodiments' ability to maintain its functionality when subjected to a wide range of forces without failing addresses a common shortfall of existing compostable options, which often sacrifice durability for compostability. The addition of embossed or debossed information, as well as the use of plant-based pigments for color and print, provides an improvement in the customization and branding of the product without compromising its environmental credentials. These features offer manufacturers the ability to include important product information, branding, or other aesthetic enhancements directly on the material of the scoop, which is not always feasible with other compostable materials.

Lastly, the disclosed embodiments' design considers the user's experience in terms of the volume of material the scoop can hold and the ease of storage. The consideration of the scoop's mean time to failure and its resistance to environmental conditions during storage ensures that the product is not only environmentally sustainable but also practical and reliable for the consumer. The disclosed embodiments advance the state of the art by providing a compostable scoop that does not compromise on durability, usability, or environmental responsibility, offering a superior alternative to both traditional and currently available biodegradable utensils.

Referring now to the drawing figures in which like reference designators refer to like elements, the claimed scoop will now be described with reference to FIGS. 1-8.

Figure 1:
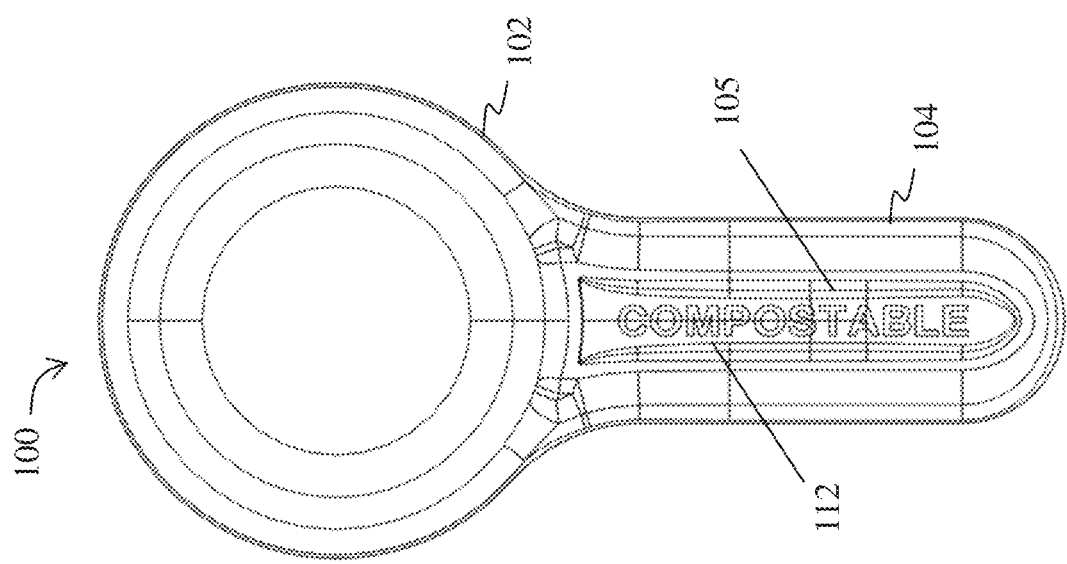
FIG. 1 is a top view of the claimed compostable scoop, in accordance with one embodiment.

FIG. 1 illustrates a top view of the compostable scoop 100, showing the ergonomic design of the handle element 104 with a channel 105 (on the top of the handle) for a comfortable grip, as well as the cup-shaped element 102 for material containment. The top view shows the scoop's dimensions and the spatial relationship between the handle 104 and the cup-shaped element 102.

Figure 2:
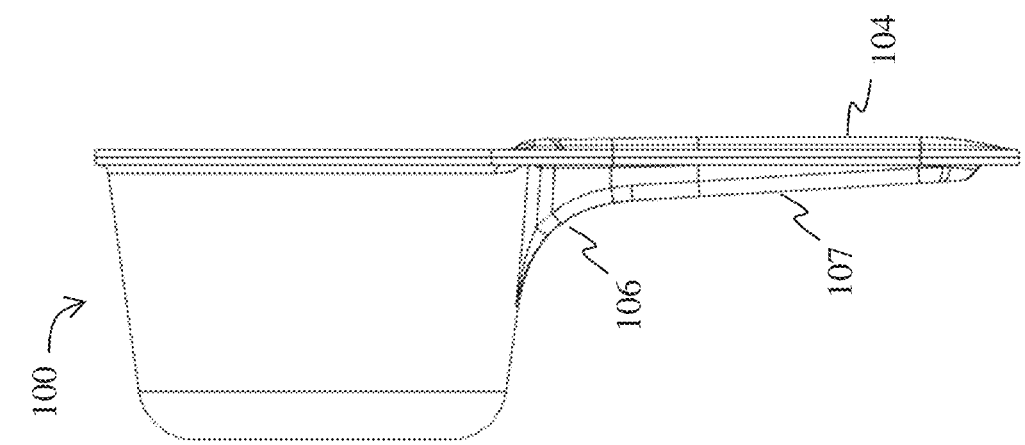
FIG. 2 is a side view of the claimed compostable scoop, in accordance with one embodiment.

In FIG. 2, a side view of the compostable scoop 100 is provided, detailing the profile of the handle 104 and the cup-shaped element 102. This view highlights the ridge 107 on the bottom of the handle element 104, which contributes to the structural rigidity of the scoop, ensuring that it can withstand forces exerted during use. Note that the ridge 107 increases in height as it extends from the distal end of the handle element 104 to the cup-shaped element 102. The compostable scoop additionally comprises a support neck element 106 located where the handle element 104 couples to the cup-shaped element 102, i.e., at the juncture between the handle element 104 and the cup-shaped element 102. This support neck element 106 provides additional strength to the area of the scoop that typically bears the most stress during use. Note that the support neck element 106 is a roughly rectangular shaped element that acts as a gusset support for the handle element. As a gusset support, the support neck element 106 reinforces the joint between the handle element 104 and the cup-shaped element 102.

Figure 4:
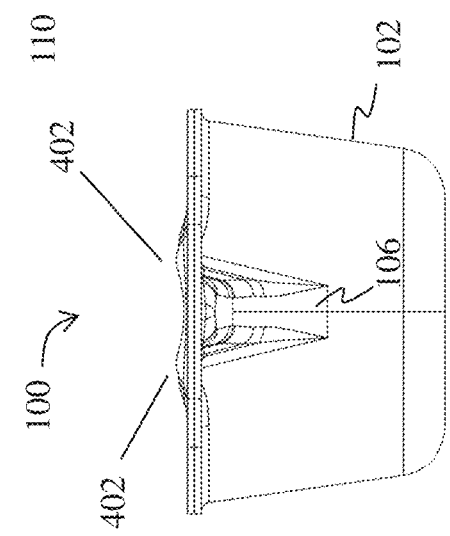
FIG. 4 is a rear view of the claimed compostable scoop, in accordance with one embodiment.

FIG. 3 presents a bottom view of the compostable scoop 102, further detailing the features that contribute to its structural integrity. The rear view of the compostable scoop 100 is depicted in FIG. 4, providing a perspective of the support neck element 106 located where the handle element 104 couples to the cup-shaped element 102. This support neck 106 is integral to the strength of the junction between the handle 104 and the cup 102. FIG. 4 also shows that the sides of the channel 105 on top of the handle element 104 form two peaks 402. Each peak 402 represents a ridge that runs parallel to (and along the side of) the channel 105, and provide additional structural stability to the handle element 104.

Figure 6:
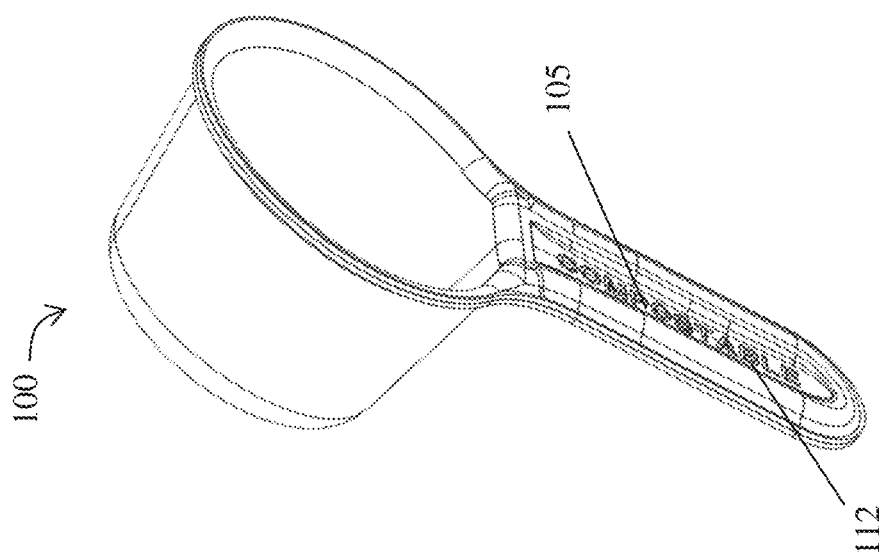
FIG. 6 is a top perspective view of the claimed compostable scoop, in accordance with one embodiment.
Figure 5:
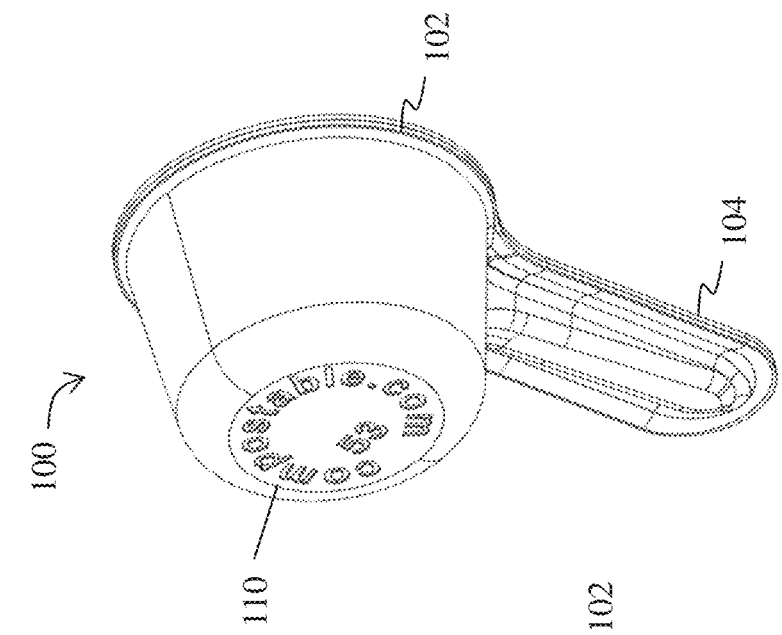
FIG. 5 is a bottom perspective view of the claimed compostable scoop, in accordance with one embodiment.

FIG. 5 offers a bottom perspective view, which shows the design of the underside of the scoop 100. This perspective shows the engineering behind the scoop's crush resistance, and the distribution of material to balance durability with compostability. FIG. 5 also shows the embossed or debossed information 110 on the cup-shaped element 102, and the potential for printed information using plant-based pigments. Conversely, FIG. 6 presents a top perspective view of the compostable scoop 100, showing the embossed or debossed information 112 on the handle 104, and the potential for printed information using plant-based pigments.

In FIG. 7, a top perspective exploded view of the compostable scoop 100 is shown, which dissects the scoop into its constituent components 702, 704, 706. This view is particularly illustrative of the individual forms 702, 706 before they are joined by the adhesive layer 704, providing insight into the manufacturing process and the layering technique that imparts the scoop with its compostable yet durable properties. The first form 702 of the scoop 100 includes a handle 104 and a cup-shaped element 102, as well as a channel 105 (on the top of the handle). The adhesive layer 704 of the scoop 100 also includes a handle 104 and a cup-shaped element 102. The second form 706 of the scoop 100 includes a handle 104 and a cup-shaped element 102, as well as ridge 107 on the bottom of the handle element 104, and a support neck element 106. The second form 706 is substantially congruent to the first form 702, such that it is shaped and sized to be pressed together with the first form, creating a pressed structure that adds to the overall durability and rigidity of the scoop. The adhesive layer 704 comprises plant-based ingredients and is both biodegradable and compostable, further contributing to the environmental benefits of the scoop.

Note that in form 706, the ridge 107 increases in height as it extends from the distal end of the handle element 104 to the cup-shaped element 102. Consequently, the channel 105 (on the top of the handle) deepens as it extends from the distal end of the handle element 104 to the cup-shaped element 102. Note also that the form 702 lacks the ridge 107 and support neck element 106 of form 706. This is because the surface of the underside of form 702 need not contact or meet the entire surface of top side of form 706. Note also that the adhesive layer 704 is configured to cover the entire surface of the underside of form 702. Further, the adhesive layer 704 is configured to cover almost the entire surface of the top side of form 706, with the exception of that portion (802 in FIG. 8) of the top surface of the form 706 above the support neck element 106, i.e., that portion of channel 105 above the support neck element 106.

Figure 8:
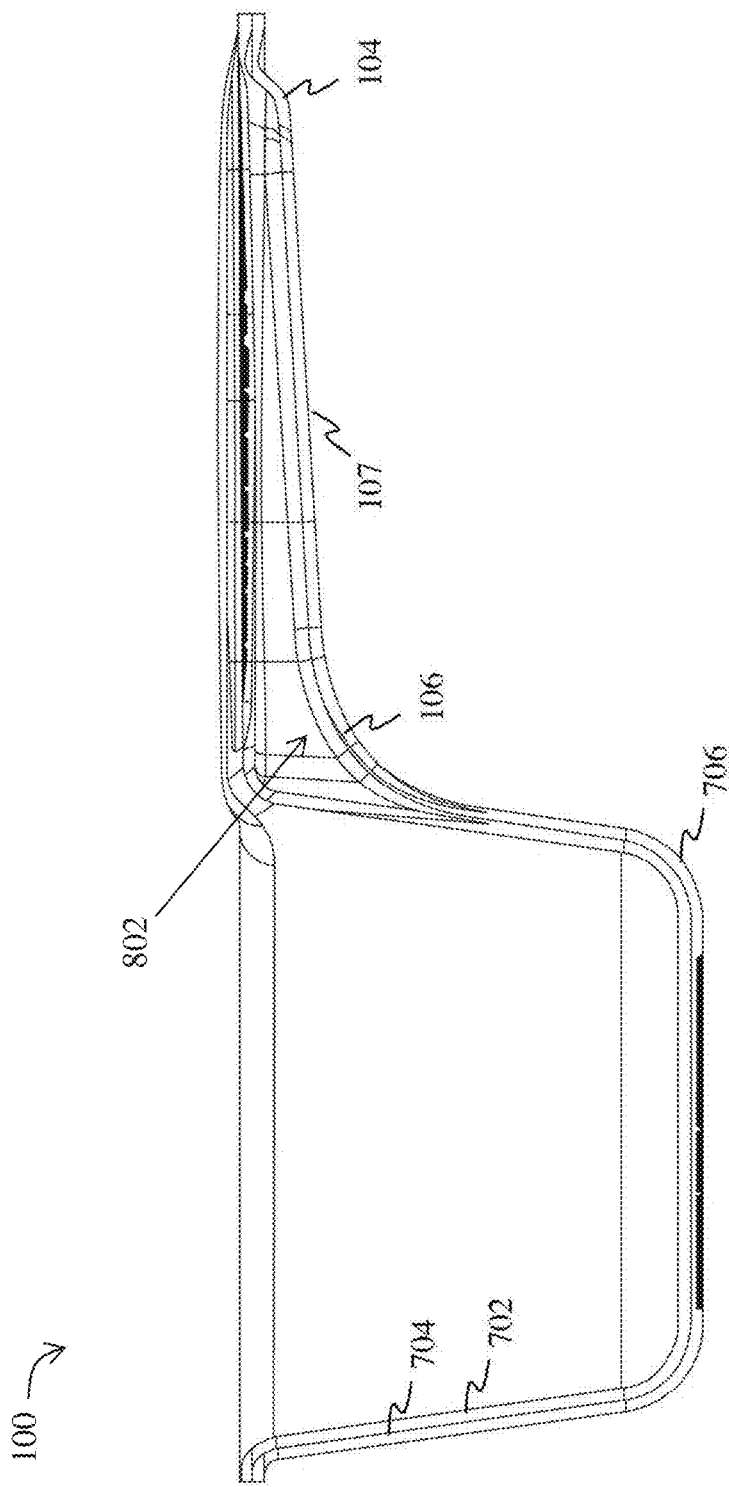
FIG. 8 is a side cross sectional view of the claimed compostable scoop, in accordance with one embodiment.

Lastly, FIG. 8 illustrates a side cross-sectional view of the compostable scoop 100. This view shows the internal structure of the scoop 100, including the thickness of the forms 702, 706, the even spread of the adhesive layer 704, and the congruency between the two forms that ensure the scoop's integrity.

The compostable scoop may be made from a sustainable, tree-free pulp material, which ensures that the entire product is biodegradable and compostable, including the adhesive layer, which comprises plant-based ingredients. The compostable scoop may also be compostable in a home composting environment. This feature is a considerable enhancement over many biodegradable products that require industrial composting facilities. By making the product home compostable, the scoop significantly reduces the environmental footprint of the scoop and makes it more accessible and practical for consumers who are increasingly seeking sustainable lifestyle products.

Home composting may be measured in a variety of different ways, which may measure levels of biodegradation, chemical composition, eco-toxicity and the like. The claimed device may be composed of plant based sustainable materials configured to be fully biodegraded in an at home compost environment at ideal ambient temperatures and with a natural occurring microbial community within a period of 12 months. At home compost is estimated to have an average internal temperature of 80 degrees Fahrenheit. In addition, the claimed device may be fully biodegrade in a natural environment under the right conditions. The amount of time for full biodegradation can vary based on temperature, humidity and microbial activity of the immediate environment. Therefore, the time period for full biodegradation will differ depending on climate, seasonal weather and temperature changes, precipitation, humidity and the surrounding soil environment in which they reside.

The shape and size of the cup-shaped element are optimized for easy penetration into the material to be scooped and to hold a specific volume of the material, which can range from 10 cubic centimeters (cc) to 94 cc. This cup-shaped element is coupled to a handle element, designed for ergonomic holding by hand. The handle element incorporates a channel on its top side, providing a comfortable grip for the user, and a ridge on its bottom side to enhance structural rigidity, enabling the user to exert the necessary force during scooping without compromising the integrity of the scoop.

Both the cup-shaped element and the handle element are composed of a compostable composition substantially comprising pulp. This pulp is preferably tree-free and/or 100% plant-based cellulose, ensuring the use of sustainable resources in the production of the scoop. The second form of the scoop is congruent to the first form, shaped and sized to be pressed on top of, and together with, the first form, creating a pressed structure that adds to the overall durability and rigidity of the scoop.

The handle element and/or the cup-shaped element can be embossed or debossed with information. This allows for the addition of measurement indications, branding, or instructional information directly onto the material of the scoop itself. Alternatively, or additionally, printed information using plant-based pigment or dye, can be placed on the scoop, which is both environmentally friendly and capable of producing high-visibility prints. The composition of the scoop may include a plant-based pigment or dye to add color to the product. This coloring process does not compromise the compostability of the scoop and provides an aesthetic appeal, potentially increasing its marketability.

The scoop is configured to have a surface roughness of approximately 3 micrometers or less to ensure effective scooping without adherence of the powdered material to the scoop. In terms of durability, the scoop is designed to withstand a force range of 6 Newtons (N) to 10 N without failing. This ensures that the scoop can handle the typical forces exerted during scooping actions. The design includes a consideration for the thickness of the scoop, which is approximately 1.8 mm. This thickness provides a balance between material efficiency and the structural integrity required for the scoop to function effectively. The scoop is also configured to be puncture resistant within a specific range of pressure (a range within 1228 pds per square inch and 1536 pds per square inch), and to be tear resistant within a specified range of force (25-35 kN/m/kg). These ranges ensure the scoop can withstand typical use scenarios without damage.

Additionally, the scoop possesses a resistance to water absorbency within a range of 40-50 grams per meter squared. This property is crucial for maintaining the integrity of the scoop when in contact with moist materials or environments. The crush resistance of the scoop may fall within a range of 1.7-2.3 Kilonewtons per meter (kN/m), ensuring that the scoop maintains its shape under weight or pressure. Lastly, the scoop is designed for a mean time to failure of no less than approximately 40 uses, providing consumers with a durable, yet compostable option for their scooping needs.

The mean density of the scoop is approximately 0.65 grams per cubic centimeter. This density is a factor in determining the environmental footprint of the product, both in terms of resource use and composting efficiency. Also, the scoop is configured to maintain its integrity and functionality when stored at room temperature, suggesting that the material composition is stable under typical storage conditions, further enhancing its usability While certain embodiments have been described, other embodiments may exist. Furthermore, although embodiments herein have been described as being associated with food-like substances, the claimed embodiments may be used with substances used in other fields such as industrial, manufacturing, automotive, marine, medical or the like. Further, the disclosed components may be modified in any manner, including by reordering components and/or inserting or deleting components, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A compostable scoop comprising:
   a) a first form comprising a cup shaped element configured for scooping a powder, the cup-shaped element coupled to a handle element configured for holding by hand, the handle element having a channel on a top of the handle element and a ridge on a bottom of the handle element for structural rigidity, as well as two ridges on the top of the handle element that run the length of the handle element;
   b) the first form composed of a compostable composition substantially comprising pulp;
   c) a second form congruent with the first form, wherein the second form is shaped and sized to be pressed on top of, and together with, the first form, and wherein when the second form is pressed on top of the first form, there is a void between the top of the first form and a bottom of the second form;
   d) the second form composed of the compostable composition substantially comprising pulp; and
   e) an adhesive layer deposited between the first form and the second form, wherein the adhesive layer covers substantially a top surface of the first form, excluding the void, and covers a portion of the bottom surface of the second form, and wherein the adhesive layer holds the first and second forms securely together.

2. The compostable scoop of claim 1, wherein the compostable composition is conducted through at home composting.

3. The compostable scoop of claim 2, wherein the pulp is does not include materials from trees.

4. The compostable scoop of claim 3, wherein the adhesive layer comprises plant-based ingredients and is biodegradable and compostable.

5. The compostable scoop of claim 4, further comprising a support neck element located where the handle element couples to the cup-shaped element.

6. The compostable scoop of claim 5, wherein the handle element and/or the cup-shaped element is embossed or debossed with information.

7. The compostable scoop of claim 6, wherein the handle element and/or the cup-shaped element includes printed information using plant-based pigment or dye, wherein said printed information is separate and distinct from the embossed or debossed information.

8. The compostable scoop of claim 7, wherein the compostable composition further comprises a plant-based pigment or dye that adds color to the scoop.

9. The compostable scoop of claim 8, wherein the scoop is configured to have a surface roughness of approximately 3 micrometers or less.

10. The compostable scoop of claim 9, wherein the scoop is configured to withstand in the range of 6 N to 10 N of force without failing.

11. The compostable scoop of claim 10, wherein the cup-shaped element is sized to hold in the range of 10 cc to 94 cc of volume of the powder.

12. The compostable scoop of claim 11, wherein a thickness of the scoop is approximately 1.8 mm.

13. The compostable scoop of claim 12, wherein the scoop is configured to be puncture resistant to a range within 1228 pds per square inch and 1536 pds per square inch.

14. The compostable scoop of claim 13, wherein the scoop is configured to be tear resistant within a range of 25-35 kN/m/kg.

15. The compostable scoop of claim 14, wherein the scoop is configured to have a resistance to water absorbency within a range of 40-50 grams per meter squared.

16. The compostable scoop of claim 15, wherein the scoop is configured to be crush resistant within a range of 1.7-2.3 kN/m.

17. The compostable scoop of claim 16, wherein the scoop is configured to have a mean density of approximately 0.65 grams per centimeters cube.

18. A compostable scoop comprising:
   a) a first form comprising a cup shaped element configured for scooping a powder, the cup-shaped element coupled to a handle element configured for holding by hand, the handle element having a channel on i-s a top of the handle element and a ridge on its a bottom of the handle element, as well as two ridges on the top of the handle element that run the length of the handle element, and further including a support neck element at a juncture between the handle element and the cup-shaped element;
   b) the first form composed of a compostable composition substantially comprising pulp;
   c) a second form substantially congruent with the first form, the second form comprising a cup shaped element coupled to a handle element having a channel on a top of the handle element, wherein the second form is shaped and sized to be pressed on top of, and together with, the first form, and wherein when the second form is pressed on top of the first form, there is a void between a top of the support neck of the first form and a bottom of the second form;
   d) the second form composed of the compostable composition substantially comprising pulp; and
   e) an adhesive layer deposited between the first form and the second form, wherein the adhesive layer covers substantially a top surface of the first form, excluding the void, and covers a portion of the bottom surface of the second form, and wherein the adhesive layer holds the first and second forms securely together.

* * * * *